(12) United States Patent
Yang et al.

(10) Patent No.: US 9,511,453 B2
(45) Date of Patent: Dec. 6, 2016

(54) SOLDER PASTE COMPOSITION, A SOLDER PASTE AND A SOLDERING FLUX

(75) Inventors: Huiying Yang, Shanghai (CN); Daoqiang Lu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 1017 days.

(21) Appl. No.: 13/530,751

(22) Filed: Jun. 22, 2012

(65) Prior Publication Data

US 2013/0042946 A1 Feb. 21, 2013

Related U.S. Application Data

(63) Continuation of application No. PCT/EP2010/070329, filed on Dec. 21, 2010.

(30) Foreign Application Priority Data

Dec. 24, 2009 (CN) .......................... 2009 1 0215134

(51) Int. Cl.
B23K 35/36 (2006.01)
B23K 35/26 (2006.01)
B23K 35/362 (2006.01)

(52) U.S. Cl.
CPC ......... B23K 35/3601 (2013.01); B23K 35/262 (2013.01); B23K 35/362 (2013.01); B23K 35/3613 (2013.01); B23K 35/3618 (2013.01)

(58) Field of Classification Search
CPC .......................... B23K 35/3601; B23K 35/262
USPC ...................................................... 428/563
IPC ....................................... B23K 35/362, 35/3613
See application file for complete search history.

(56) References Cited

U.S. PATENT DOCUMENTS

| 4,169,167 | A | * | 9/1979 | McDowell | .................. 427/494 |
| 6,641,679 | B2 | | 11/2003 | Nishina et al. | |
| 2005/0230457 | A1 | | 10/2005 | Kay et al. | |
| 2006/0147683 | A1 | * | 7/2006 | Ikeda et al. | .................. 428/209 |

FOREIGN PATENT DOCUMENTS

| EP | 1728585 | | 12/2006 |
| EP | 2042580 | | 4/2009 |
| JP | 2004291019 | A | 10/2004 |
| JP | 2005152912 | | 6/2005 |
| JP | 2005152999 | A | 6/2005 |
| JP | 2006009125 | A | 1/2006 |
| JP | 2010221260 | | 10/2010 |

OTHER PUBLICATIONS

International Search Report in connection with International Patent Application No. PCT/EP2010/070329 mailed Jun. 17, 2011.
Georgia Institute of Technology, Replacing lead-based solder: molecularly wires and corrosion control boost performance of electrically conductive adhesives, retrieved from URL:www.sciencedaily.com/release/2005/03/050323143858.htm, retrieved on May 24, 2011.

* cited by examiner

*Primary Examiner* — Weiping Zhu
(74) *Attorney, Agent, or Firm* — Steven C. Bauman

(57) ABSTRACT

The present invention relates to a solder paste composition, a solder paste and a soldering flux. The soldering flux comprises a resin, a thixotropic agent, an activator, a solvent as well as a long-chain thiol and/or an organic chelating agent.

14 Claims, No Drawings

SOLDER PASTE COMPOSITION, A SOLDER PASTE AND A SOLDERING FLUX

The present invention relates to a solder paste composition, a solder paste and a soldering flux.

A solder paste is a paste solder material obtained by homogeneously mixing a alloy solder powder and a soldering flux. The current mostly used alloy solder powders include Sn—Ag, Sn—Pb, Sn—Sb, Sn—Cu, Sn—Bi, Sn—Ag—Cu alloys, etc. A soldering flux generally consists of or comprises a resin, a thixotropic agent, an activator, a solvent and optionally other additives. A soldering flux is a key material for cleaning metal surfaces, improving wettability, preventing solder materials from oxidation and assuring the quality of a solder paste and/or the excellent processability of said material. In addition the soldering flux has a great influence on the storage stability of a solder paste.

A solder paste will normally harden or solidify over time during storage. The rate of hardening or solidification is usually used to determine the storage stability of a solder paste. Solder pastes having high storage stability normally exhibit a rather slow hardening or solidification, whereas solder pastes having low storage stability are characterized by a rather fast hardening or solidification.

In the existing solder pastes, organic acids, small molecules of organic amines or halide-containing compounds are used as activators. Said activators are capable of interacting with the alloy solder powder during storage of the solder paste, thereby affecting the rheological property and other properties. Notably the aforementioned activators can significantly reduce the storage stability of the solder paste.

Notwithstanding the state of the technology, it would be desirable to provide a soldering flux, a solder paste composition and a solder paste, in order to overcome the technical problem that the activator in the existing solder pastes interacts with the alloy solder powder during storage of the solder paste, thereby reducing the storage stability of the solder paste. The solder paste of the present invention exhibits very high storage stability in combination with excellent solderability.

The storage stability of the solder paste of the present invention is greatly improved by introducing a long-chain thiol and/or an organic chelating agent into a soldering flux.

Thus, the present invention relates to a soldering flux which comprises or consists of a resin, a thixotropic agent, an activator, a solvent as well as a long-chain thiol and/or an organic chelating agent.

As used in the present invention, the singular "a", "an" and "the" includes the plural reference unless the context clearly indicates otherwise.

In the present invention, said long-chain thiol is a compound with at least one —SH group having a chain length greater than or equal to 5 carbon atoms, preferably greater than or equal to 7 carbon atoms, wherein said carbon atoms are preferably covalently linked to each other.

The soldering flux of the present invention can comprise one long-chain thiol or a mixture of different long-chain thiols. In one embodiment the long-chain thiol is selected from the group consisting of one or more of general formula

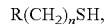

R(CH$_2$)$_n$SH, wherein R is methyl, carboxyl, hydroxyl, formyl or amido, and n is 7 to 21, preferably 12 to 18.

Preferably, the long-chain thiol is selected from hexanethiol, octanethiol, decanethiol, dodecanethiol, and octadecanethiol and/or mixtures thereof.

In the present invention, the amount of said long-chain thiol is an appropriate amount capable of forming a single molecule protective film on the surface of alloy solder powder particles while not influencing other performances of the solder paste. The long-chain thiol may be present in the soldering flux of the present invention in an amount of 0.2 to 10 wt %, more preferably in an amount of 0.5 to 5 wt %, and particularly preferably in an amount of 0.75 to 2.5 wt %, based on the total amount of the soldering flux. When the amount used is lower than 0.2 wt %, the formation of a single molecule film on the surface of the alloy solder powder particles can be incomplete. When the amount used is higher than 10 wt %, the long-chain thiol can negatively affect other properties of the solder paste, such as solderability or printability, etc.

The soldering flux of the present invention can comprise one organic chelating agent or a mixture of different organic chelating agents.

The term organic chelating agent preferably refers to compounds having at least two functions capable of coordinating to a metal or metal-comprising compound. More preferably the organic chelating agent is selected from N-chelating agents, in which each function capable of coordinating to a metal or metal-comprising compound contains at least one nitrogen atom.

The organic chelating agent can be selected from compounds, comprising at least one substituted or unsubstituted 1,10-naphthisodiazine (o-naphthisodiazine) structural unit or element. The term 1,10-phenanthroline can also be used for 1,10-naphthisodiazines. In the present invention both terms are used interchangeably.

In the present invention, said organic chelating agent is preferably selected from o-naphthisodiazine (1,10-naphthisodiazine) chelating agents. More preferable the organic chelating agent is selected from 1,10-o-naphthisodiazine, 2,9-dimethyl-4,7-diphenyl-1,10-phenanthroline, 4,7-dimethyl-1,10-o-naphthisodiazine and 4,7-diphenyl-1,10-o-naphthisodiazine and/or mixtures thereof.

In the present invention, the amount of said organic chelating agent is an appropriate amount capable of forming a single molecule protective film on the surface of alloy solder powder particles while not influencing other performances of the solder paste. The organic chelating agent may be present in the soldering flux of the present invention in an amount of 0.2 to 10 wt %, more preferably in an amount of 0.5 to 5 wt %, and particularly preferably in an amount of 0.75 to 2.5 wt %, based on the total amount of the soldering flux. When the amount used is lower than 0.2 wt %, the formation of a single molecule film on the surface of the alloy solder powder particles can be incomplete. When the amount used is higher than 10 wt %, the long-chain thiol can negatively affect other properties of the solder paste, such as solderability or printability, etc.

In one embodiment the soldering flux comprises a mixture of at least one long-chain thiol of the present invention and at least one organic chelating agent of the present invention. By using mixtures of at least one long-chain thiol and at least one organic chelating agent a solder paste of the present invention can be obtained which exhibits very high storage stability in combination with excellent solderability.

If a combination of at least one long-chain thiol and at least one organic chelating agent is used, the amount of said long-chain thiol and said organic chelating agent is an appropriate amount capable of forming a single molecule protective film on the surface of alloy solder powder particles while not influencing other performances of the solder paste. Preferably the long-chain thiol and the organic chelating agent may be present in the soldering flux of the present invention in an amount of 0.2 to 10 wt %, more preferably in an amount of 0.5 to 5 wt %, and particularly preferably in an amount of 0.75 to 2.5 wt %, based on the total amount of the soldering flux. When the amount used is lower than 0.2 wt %, the formation of a single molecule film on the surface of the alloy solder powder particles can be incomplete. When the amount used is higher than 10 wt %, the long-chain thiol and the organic chelating agent can negatively affect other properties of the solder paste, such as solderability or printability, etc.

In the present invention the resin can be selected from rosin resins, acid modified rosin resins, hydrogenated rosin reins, disproportionated rosin resins and/or polymerized rosin reins, and/or mixtures thereof.

The amount of the resin may be a conventional amount in the art. Preferably the resin is present in an amount of 10 to 60 wt %, and more preferably in an amount of 30- to 55 wt %, based on the total amount of the soldering flux.

The soldering flux of the present invention additionally comprises at least one thixotropic agent. The thixotropic agent can be selected from polyamides, hydrogenated castor oils, and/or amide modified hydrogenated castor oils, and/or mixtures thereof.

The amount of the thixotropic agent may be a conventional amount in the art. Preferably the thixotropic agent is present in an amount of 1 to 10 wt %, based on the total amount of the soldering flux.

Another component of the soldering flux of the present invention is at least one activator. The activator can be selected from halide containing compounds, organic acid compounds and/or organic amine compounds and/or mixtures thereof.

The amount of the activator may be a conventional amount in the art. Preferably the activator is present in an amount of 0.5 to 30 wt %, based on the total amount of the soldering flux.

A further component of the soldering flux of the present invention is at least one solvent. In one embodiment the solvent is a diol monoether and/or a diol diether solvent, such as diethylene glycol monohexyl ether and/or polyethylene glycol dibutyl ether, etc. The amount of the solvent may be a conventional amount in the art. Preferably the solvent is present in an amount of 10 to 60 wt %, based on the total amount of the soldering flux.

The soldering flux of the present invention may also contain other conventional additives, such as plasticizer and/or antioxidant, etc.

The soldering flux of the present invention may be in the one component form in which all the ingredients are mixed together, and may also be in the form of a multi-container package or kit in which each component is in a separate container or several ingredients are grouped into one or more containers.

In the present invention, said soldering flux may be prepared by a conventional method in the art, for example by heating and mixing each component.

In one embodiment of the present invention the soldering flux comprises or consists of, based on the total amount of the soldering flux:
  from 10 to 60 wt % of at least one resin;
  from 1 to 10 wt. % of at least one thixotropic;
  from 0.5 to 30 wt % of at least one activator;
  from 10 to 60 wt % of at least one solvent;
  from 0.2 to 10 wt % of at least one long-chain thiol and/or of at least one organic chelating agent;
  from 0 to 30 wt % of at least one additive.

The present invention also relates to a solder paste composition which comprises the soldering flux of the present invention and at least one alloy solder powder. The alloy solder powder can be selected from lead-free alloy solder powder or lead-containing alloy solder powder.

The term "lead-free alloy solder powder" refers to alloy solder powders which are substantially free of lead, which means that the lead content is less than 5 wt %, preferably less than 1 wt %, and more preferably less than 0.01 wt %, based on the total amount of the alloy solder powder.

The volume ratio of the soldering flux to the alloy solder powder is preferably from 0.8:1 to 1.2:1, more preferably from 0.85:1 to 1.1.5:1. The lead-free solder powder is preferably selected from Sn—Ag—Cu, Sn—Ag, Sn—Cu, Sn—Zn, and/or Sn—Bi alloy. The lead-containing solder powder is preferably Sn—Pb alloy. The alloy solder powder is preferably in the form of a spherical powder, wherein the average particle size of said spherical powder is preferably in the range of 1 to 45 μm, more preferably in the range of 2 to 35 μm.

As used herein, the term "average particle size" refers to the $D_{50}$ value of the cumulative volume distribution curve at which 50% by volume of the particles have a diameter less than said value. The average particle size or $D_{50}$ value is measured in the present invention through laser diffractometry preferably using a Malvern Mastersizer 2000 available from Malvern Instruments Ltd. In this technique, the size of particles in suspensions or emulsions is measured using the diffraction of a laser beam, based on application of either Fraunhofer or Mie theory. In the present invention, Mie theory or a modified Mie theory for non-spherical particles is applied and the average particle sizes or $D_{50}$ values relate to scattering measurements at an angle from 0.02 to 135 degrees relative to the incident laser beam.

In the present invention, said solder paste composition is in the form of a multi-container package or kit in which each ingredient is in a separate container or several ingredients are grouped into one or more containers.

In one embodiment the solder paste composition in the form of a kit comprises at least two containers. In order to avoid any physical or chemical contact between the long-chain thiol and/or the organic chelating agent as a first part and the alloy solder powder as a second part, both parts are preferably not present in the same container. For example, said solder paste composition is in the form of a two-container package, wherein one container comprises the soldering flux and the other container comprises the alloy solder powder. In another embodiment, said solder paste composition is in the form of a three-container package, wherein one container comprises the long-chain thiol and/or the organic chelating agent, another container comprises further components of the soldering flux of the present invention, and the third container comprises the alloy solder powder.

The present invention also relates to a solder paste which is a physical mixture of all components of the solder paste composition of the present invention.

In the solder paste of the present invention, a single molecule film preferably covers the entire particle surface of the alloy solder powder. This single molecule film is formed by the self-assembly of one or more of the long-chain thiol and/or organic chelating agents.

The solder paste of the present invention may also contain conventional additives, such as plasticizers and/or antioxidants, etc.

The solder paste of the present invention may be prepared by mixing the soldering flux of the present invention and the alloy solder powder.

In order to have high storage stability over a long period of time, said solder paste is preferably stored at temperatures from 0 to 5° C.

The examples of the present invention demonstrate that the solder paste of the present invention preferably has a viscosity change of less than ±6% when it is stored at 30° C. for 4 days. In contrast to that, conventional solder pastes show a viscosity increase of 84.1% under comparable storage condition. This indicates that the solder paste of the present invention has excellent storage stability.

The solder paste of the present invention exhibits greatly improved storage stability, an excellent solderability, and can be produced by simple preparation steps.

EXAMPLES

Unless specially indicated, all materials and agents used in the present invention are commercially available.
Preparation of the Soldering Flux:

The solvent, resin, activator, and thixotropic agent of the present invention were added in proportions into a stainless steel reaction tank. The mixture was stirred at 100 to 150° C. until all components were completely dissolved. Afterwards the mixture was quickly cooled, supplemented with partially volatilized solvent, and stored in an airtight manner for further use.
Preparation of the Solder Paste:

11.5 wt % of soldering flux and 88.5 wt % of alloy solder powder were placed into a double planetary stirrer, stirred heterogeneously at room temperature, and packaged in 500 g solder pots.

Example 1

In this example 88.5 wt % of the alloy solder powder Sn-3.0Ag-0.5Cu and 11.5 wt % of a soldering flux containing an organic chelating agent were used.

The specific formulations of the soldering flux are as follows:

| | |
|---|---|
| Rosin resin | 50 wt % |
| Diethylene glycol hexyl ether | 40 wt % |
| Succinic acid | 1.00 wt % |
| Diphenylguanidine hydrobromide | 2.00 wt % |
| o-naphthisodiazine | 1.00 wt % |
| Fatty acid amide wax | 6.00 wt % |
| Total | 100% |

Example 2

In this example 88.5 wt % of the alloy solder powder Sn-3.0Ag-0.5Cu and 11.5 wt % of a soldering flux containing a long-chain thiol were used.

The specific formulations of the soldering flux are as follows:

| | |
|---|---|
| Rosin resin | 50 wt % |
| Diethylene glycol hexyl ether | 40 wt % |
| Succinic acid | 1.00 wt % |
| Diphenylguanidine hydrobromide | 2.00 wt % |
| Dodecanethiol | 1.00 wt % |
| Fatty acid amide wax | 6.00 wt % |
| Total | 100% |

Example 3

In this example 88.5 wt % of the alloy solder powder Sn-3.0Ag-0.5Cu and 11.5 wt % of a soldering flux containing a long-chain thiol were used.

The specific formulations of the soldering flux are as follows:

| | |
|---|---|
| Rosin resin | 50 wt % |
| Diethylene glycol hexyl ether | 40 wt % |
| Succinic acid | 1.00 wt % |
| Diphenylguanidine hydrobromide | 2.00 wt % |
| Octadecanethiol | 1.00 wt % |
| Fatty acid amide wax | 6.00 wt % |
| Total | 100% |

Comparative Example

In this example 88.5 wt % of the alloy solder powder Sn-3.0Ag-0.5Cu and 11.5 wt % of a soldering flux were used. The soldering flux did not contain a long-chain thiol and/or organic chelating agent.

The specific formulations of the comparative soldering flux composition are as follows:

| | |
|---|---|
| Rosin resin | 50 wt % |
| Diethylene glycol hexyl ether | 41 wt % |
| Succinic acid | 1.00 wt % |
| Diphenylguanidine hydrobromide | 2.00 wt % |
| Fatty acid amide wax | 6.00 wt % |
| Total | 100% |

Storage Stability and Wettability

The storage stability and the soldering wettability for all examples and comparative examples were determined Malcom Viscosity:

The viscosities before and after storage were measured using a Malcom PCU-201 viscosimeter, respectively. The viscosities at 10 rpm are compared to characterize the viscosity change.

Viscosity change %=(Viscosity at 10 rpm after storage−Viscosity at 10 rpm before storage)/Viscosity at 10 rpm before storage After the solder pastes of the aforementioned examples were stored at 30° C. for 4 days, their storage stability was measured by determining the Malcom viscosity. The tests and comparative results are shown in Table 1.

TABLE 1

| Malcom viscosity | Comparative Example 1 | Example 1 | Example 2 | Example 3 |
|---|---|---|---|---|
| Viscosity change (stored at 30° C. for 4 days) | 84.1% | 5.8% | −2.4% | 2.7% |
| Soldering wettability (IPC-TM-650 2.4.45) | No dewet or nonwet on copper, excellent wettability | | | |

The results of Table 1 demonstrate that the solder pastes of the present invention (Examples 1 to 3) exhibit better storage stability than the comparative formulation 1.

This indicates that the addition of long-chain thiols and/or organic chelating agents, such as o-naphthisodiazines significantly improves the storage stability of solder pastes, wherein the soldering wettability remains excellent.

What is claimed is:

1. A soldering flux, which comprises a resin, a thixotropic agent, an activator, a solvent as well as a long-chain thiol and optionally an organic chelating agent, wherein the long-chain thiol is selected from the group consisting of hexanethiol, octanethiol, decanethiol, dodecanethiol, and/or octadecanethiol and/or mixtures thereof.

2. The soldering flux of claim 1, wherein the organic chelating agent comprises at least one substituted or unsubstituted o-naphthisodiazine structural element.

3. The soldering flux of claim 1, wherein the organic chelating agent is selected from 1,10-o-naphthisodiazine, 2,9-dimethyl-4,7-diphenyl-1,10-phenanthroline, 4,7-dimethyl-1,10-o-naphthisodiazine, and 4,7-diphenyl-1,10-o-naphthisodiazine, and/or mixtures thereof.

4. The soldering flux of claim 1, wherein the long-chain thiol, the organic chelating agent or both, is/are present in an amount of 0.2 to 10 wt %, based on the total amount of the soldering flux.

5. The soldering flux of claim 1, wherein the resin is selected from rosin resins, acid modified rosin resins, hydrogenated rosin resins, disproportionated rosin resins and/or polymerized rosin resins and/or mixtures thereof.

6. The soldering flux of claim 1, wherein the resin is present in an amount of 10 to 60 wt %, based on the total amount of the soldering flux.

7. The soldering flux of claim 1, wherein the thixotropic agent is selected from polyamides, hydrogenated castor oils, amide modified hydrogenated castor oils and/or mixtures thereof.

8. The soldering flux of claim 1, wherein the thixotropic agent is present in an amount of 1 to 10 wt %, based on the total amount of the soldering flux.

9. The soldering flux of claim 1, wherein the activator is selected from halide containing compounds, organic acids, organic amine compounds and/or mixtures thereof.

10. The soldering flux of claim 1, wherein the activator is present in an amount of 0.5 to 30 wt %, based on the total amount of the soldering flux.

11. The soldering flux of claim 1, wherein the solvent is selected from diol monoether, diol diether solvents or mixtures thereof.

12. The soldering flux of claim 1, wherein the solvent is present in an amount of 10 to 60 wt %, based on the total amount of the soldering flux.

13. The soldering flux of claim 12, wherein the solvent is diethylene glycol monohexyl ether and/or polyethylene glycol dibutyl ether.

14. The soldering flux of claim 1, wherein the soldering flux comprises, based on the total amount of the soldering flux:
   a) from 10 to 60 wt % of at least one resin;
   b) from 1 to 10 wt. % of at least one thixotropic agent;
   c) from 0.5 to 30 wt % of at least one activator;
   d) from 10 to 60 wt % of at least one solvent; and
   e) from 0.2 to 10 wt % of at least one long-chain thiol and/or of at least one organic chelating agent; and
   f) from 0 to 30 wt % of at least one additive.

* * * * *

UNITED STATES PATENT AND TRADEMARK OFFICE
CERTIFICATE OF CORRECTION

Page 1 of 1

PATENT NO. : 9,511,453 B2
APPLICATION NO. : 13/530751
DATED : December 6, 2016
INVENTOR(S) : Huiying Yang and Daoqiang Lu It is certified that error appears in the above-identified patent and that said Letters Patent is hereby corrected as shown below:

In the Specification

Column 3, Line 10: Change "reins" to -- resins --.

Column 3, Line 11: Change "reins" to -- resins --.

Column 3, Line 14: Change "30-" to -- 30 --.

Signed and Sealed this
Sixth Day of June, 2017

Michelle K. Lee
*Director of the United States Patent and Trademark Office*